United States Patent [19]

Glimpel et al.

[11] Patent Number: 4,725,064
[45] Date of Patent: Feb. 16, 1988

[54] CHUCK APPARATUS FOR WORKPIECES OR TOOLS HAVING A CLAMPING SLEEVE OF VARIABLE SIZE

[75] Inventors: Helmut Glimpel; Volker Wenzel, both of Lauf, Fed. Rep. of Germany

[73] Assignee: Emuge-Werk Richard Glimpel Fabrik für Präzisionswerkzeuge (vormals Moschkau & Glimpel), Lauf, Fed. Rep. of Germany

[21] Appl. No.: 7,301

[22] Filed: Jan. 27, 1987

[30] Foreign Application Priority Data

Feb. 4, 1986 [DE] Fed. Rep. of Germany ....... 3603301

[51] Int. Cl.$^4$ ............................................. B23B 31/20
[52] U.S. Cl. ...................................... 279/47; 279/46 R
[58] Field of Search ............................. 279/47, 41–46, 279/48, 50

[56] References Cited

U.S. PATENT DOCUMENTS

| | | | |
|---|---|---|---|
| 1,822,685 | 9/1931 | Wilson | 279/46 R X |
| 2,755,094 | 7/1956 | Benjamin | 279/47 |
| 4,496,163 | 1/1985 | Bernfeld | 279/46 R X |

*Primary Examiner*—Gil Weidenfeld
*Assistant Examiner*—Steven C. Bishop
*Attorney, Agent, or Firm*—Jordan and Hamburg

[57] ABSTRACT

Chuck apparatus for workpieces or tools with a base body provided with a cylindrical borehole and a concentrically thereto arranged cylindrical clamping sleeve of variable size with internal and external annular recessed grooves displacedly arranged relative to each other in the axial direction as well as a tightening nut or the like acting axially upon the clamping sleeve axially supported on a front end of the opposite side, whereby at least the clamping sleeve's end located remotely from the tightening nut or the like is configured as a taper sleeve acting in conjunction with a counter taper.

8 Claims, 1 Drawing Figure

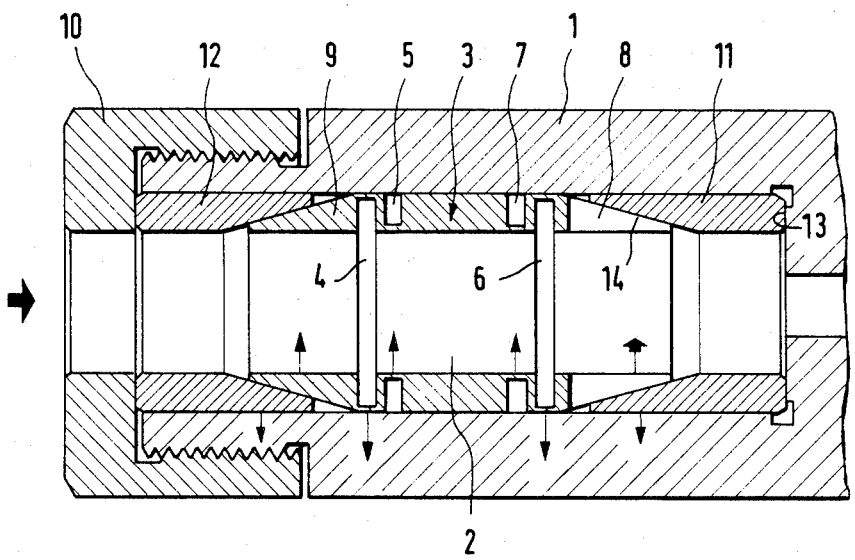

CHUCK APPARATUS FOR WORKPIECES OR TOOLS HAVING A CLAMPING SLEEVE OF VARIABLE SIZE

The invention refers to a chuck apparatus for workpieces or tools, the chuck apparatus having a base body provided with a cylindrical borehole and a concentrically thereto arranged clamping sleeve of variable size with internal and external annular recessed grooves displacedly arranged relative to each other in the axial direction as well as a tightening nut or the like acting axially upon the clamping sleeve axially supported on a front end of the opposite side.

In addition to such clamping apparatus, wherein the variability of the diameter of the clamping sleeve is attained by longitudinal grooves (DBP 16 02 749), there also exist arrangements, wherein there are provided internal and external annular recessed grooves displacedly arranged relative to each other in the axial direction. Due to the axial compression of the clamping sleeve by the tightening nut or the like, there results a change of diameter simultaneously both of the internal and the external diameter, so that the clamping sleeve supports itself both towards the outside in the borehole of the cylindrical base body and towards the inside on the cylindrical external wall of the workpiece or tool. In case of simple short chuck apparatus, this can result in difficulties with respect to the precision of the accuracy of rotation of the clamped-in tool, because a direct attack of the clamping screw can lead to corresponding torsions due to thread inaccuracy. Furthermore, in case of short simple chuck apparatus with clamping sleeves provided with annular recessed grooves displacedly arranged relative to each other in the axial direction, the attainable clamping force and, thus, the transmissible torque is quite small for specific applications.

The invention is therefore based on the object of providing a chuck apparatus of the initially mentioned kind of such configuration that while retaining a very simple construction and keeping the model small, it has a high accuracy of rotation and is suitable for the transmission of high torques.

The solution of the object according to the invention provides that at least the end of the clamping sleeve which is remote from the tightening nut or the like is configured as a taper sleeve acting in conjunction with a counter taper.

Because of the combination according to the invention of a chuck apparatus for the clamping sleeve with a tapered gripper, whereby the taper sleeve should preferably be axially slotted, there results at the internal end of the chuck apparatus an increased easier radial collapsibility, by means of which, to an especial extent, high torques can be transmitted. The clamping sleeve with annular recessed grooves interposed at the end of the taper sleeve serves as much as ever for a more precise alignment of the clamped-in tool with respect to the tapered gripper.

In order to simplify the construction, the counter taper should be formed on a loose guide ring. This feature provides the additional advantage that by means of slotting this guide ring, there can be attained an increased expandability in the outward direction and thus an increased bracing ability in the cylindrical base body.

It has proven to be especially advantageous if also the end of the clamping sleeve which faces the tightening nut or the like is configured as a taper sleeve which, however, is in this case unslotted, is associated with a counter taper sleeve configured as a loose guide ring which is acted upon by the tightening nut.

Thereby, the construction is such that at the introduction of the clamping force via the tightening nut or the like, there closes at first the remotely located rear taper sleeve which is softer in view of its slotting. Subsequently, under a stronger axial bracing of the center section of the clamping sleeve, is attained an exact alignment of the clamped-in tool. This alignment is additionally improved by the frontal unslotted taper sleeve.

By providing a guide ring between the tightening nut and the unslotted taper sleeve, imprecisions of the thread, which would lead to a respective dislocation of the tightening nut, cannot act upon the even bracing of the unslotted taper sleeve, because such tolerances and dislocations are absorbed by the guide ring.

Further advantages, characteristics and details of the invention result from the following description of an exemplified embodiment as well as from the drawings illustrating a longitudinal sectional view of a chuck apparatus according to the invention.

BRIEF DESCRIPTION OF THE DRAWING

The signal drawing FIGURE is a cross-sectional view of a chuck apparatus according to one embodiment of the invention.

DESCRIPTION OF THE PREFERRED EMBODIMENTS

In the drawing a base body 1 has cylindrical internal borehole 2, in which there is concentrically arranged a cylindrical clamping sleeve 3 having internal and external annular recessed grooves 4, 5 or 6, 7 displacedly arranged relative to each other in the axial direction.

The two ends of the clamping sleeve 3 are configured as taper sleeves 8 or 9, whereby the taper sleeve 8 located remotely from a tightening nut 10 is slotted, whereas the taper sleeve 9 is preferably configured without slotting. Each of the taper sleeves 8, 9 is associated with a counter taper sleeve configured as a loose guide ring 11 or 12, whereby the counter taper sleeve can be either of a slotted or unslotted configuration. The guide ring 11 is supported on a shoulder 13 of the base body.

At the introduction of the clamping force via the tightening screw 10 the guide ring 12 serves for preventing the imprecisions of the thread and thereby caused dislocations of the clamping screw from acting upon the clamping sleeve or the taper sleeves 8, 9 thereof.

The invention is not limited to the illustrated exemplified embodiment. In addition to a different kind of introducing the clamping force via a spring washer packing or the like instead of via a tightening nut, although, in these cases, the distortion compensation according to the invention via the clamping sleeve 12 may no longer be all that necessary, there could also be selected a simplified embodiment in which, in addition to the center section of the clamping sleeve with the annular recessed grooves only at the internal end, the slotted clamping sleeve 8 is provided with an associated guide ring 11.

We claim:

1. Chuch apparatus for workpieces comprising a bore body having an elongated cylindrical opening, a clamping sleeve disposed in said cylindrical opening, said clamping sleeve having internal and external spaced grooves, a threaded tightening means threaded to said base body and operable to engage one end portion of said clamping sleeve to apply an axial force to said clamping sleeve, counter taper means on said base body and disposed to engage the other end portion of said clamping sleeve, said clamping sleeve having its other end portion in the form of a tapered sleeve which engages said counter taper means such that when said threaded tightening means is threadedly tightened on said base body, said tapered sleeve forcibly engages said counter taper means.

2. Chuck apparatus according to claim 1, wherein said tapered sleeve has axial slots.

3. Chuck apparatus according to claim 1, wherein said counter taper means comprises a tapered ring member disposed in said cylindrical opening.

4. Chuck apparatus according to claim 3, wherein said tapered ring member has axial slots.

5. Chuck apparatus according to claim 1, wherein said one end portion of said clamping sleeve is in the form of a tapered sleeve.

6. Chuck apparatus according to claim 5, wherein said tapered sleeve on said one end portion of said clamping sleeve is unslotted.

7. Chuck apparatus according to claim 1, wherein said threaded tightening means comprises one part threaded to said base body and another part which is engageable by said first part, said second part constituting a tapered ring member disposed in said cylindrical opening and engaging said tapered sleeve of said threaded tightening means.

8. Chuck apparatus according to claim 7, wherein said tightening means has axial slots.

* * * * *